United States Patent [19]
Ford

[11] 3,961,528
[45] June 8, 1976

[54] METER SETTING DEVICE

[75] Inventor: Stanley W. Ford, Wabash, Ind.

[73] Assignee: The Ford Meter Box Company Inc., Wabash, Ind.

[22] Filed: Sept. 6, 1974

[21] Appl. No.: 503,617

[52] U.S. Cl. .............................. 73/201; 137/364; 248/60; 248/68 R
[51] Int. Cl.² ........................................ G01F 15/18
[58] Field of Search ............... 73/201, 273; 248/60, 248/68, 87, 88, 89, 109, 317; 285/30, 61; 137/364

[56] References Cited
UNITED STATES PATENTS

| | | | |
|---|---|---|---|
| 620,588 | 3/1889 | Hoppes | 285/30 |
| 1,101,908 | 6/1914 | Dennison | 73/201 |
| 1,813,644 | 7/1931 | Sutliff | 73/201 |
| 1,832,852 | 11/1931 | Bassett | 73/201 |
| 2,576,630 | 11/1951 | Mueller et al. | 285/30 |
| 3,111,030 | 11/1963 | Whitman | 73/201 |
| 3,462,104 | 8/1969 | Muller et al. | 248/317 |
| 3,542,294 | 11/1970 | Tucker | 248/68 R |
| 3,730,213 | 5/1973 | Bates | 73/201 X |

FOREIGN PATENTS OR APPLICATIONS

| | | | |
|---|---|---|---|
| 1,558,500 | 2/1969 | France | 248/68 R |

*Primary Examiner*—Richard C. Queisser
*Assistant Examiner*—Stephen A. Kreitman
*Attorney, Agent, or Firm*—Woodard, Weikart, Emhardt & Naughton

[57] ABSTRACT

A combination is disclosed of a meter box having a meter connected to service pipes within it. To position the service pipes and meter within the meter box, a tubular member is positioned within the meter box and has two parallel transaxial holes through which the service pipes pass. The tubular member is held in place either by an expansible portion which causes pressure against opposing sides of the meter box, by a stake which connects between it and the floor of the meter box, or by wires suspending the tubular portion from the side walls of the meter box.

13 Claims, 5 Drawing Figures

3,961,528

METER SETTING DEVICE

BACKGROUND OF THE INVENTION

1. Field of the Invention

This invention relates to fluid handling systems with static constructional installations for installing meters in wells below ground (Class 137, subclass 364). The invention also relates to a device to assist in positioning a meter within a meter box.

2. Description of the Prior Art

It has long been known to mount meters within a well positioned below ground. One such combination is shown in U.S. Pat. No. 974,650 to Edwin H. Ford (1909). In most meter boxes, the position of the meter has been maintained by rigid service pipes extending from the ground at the base of the meter box and upwardly to the meter itself. Often times additional apparatus is associated with the service pipes to maintain their relative positions in normal use and when meters are being inserted or removed, such as is shown in the following U.S. Pat. Nos.

1,847,606 to Edwin H. Ford;
1,938,896 to John L. Ford;
2,165,626 to John L. Ford;
2,461,888 to Wilbur E. Ford; and
3,511,524 to Stanley W. Ford and Max L. Stevens.

In addition, U.S. Pat. No. 2,619,837 to Richard V. Ford discloses a meter box and meter mounting where the fittings connecting the service pipes to the meter nest in the walls of the meter box.

While all of the above patents disclose techniques for positioning meters which work acceptably, they all rely upon the use of rigid materials to maintain the position of the meter. With the increasingly prevalent usage of relatively flexible plastic service pipes, and with the increasing costs of copper and other metals previously used in meter setting devices, problems have arisen in economically positioning meters within meter boxes. U.S. Pat. No. 3,511,524 to Stanley W. Ford and Max L. Stevens discloses one device for positioning a meter which combines rigid pipes with the flexible plastic pipes.

It has been found that previously known setter devices have not been wholly successful in economically positioning water meters when used with plastic pipe, one reason being that such plastic conduit inherently possesses a relatively low resistance to torque stress. As a consequence, problems arise when most previously known setter devices are associated with a supply or service line formed of plastic conduit to support a meter or other relatively heavy device in offset relation above such line. It is found that the meter is likely to sag to one side or the other out of vertical alignment with the line.

U.S. Pat. No. 2,661,483 to Tortorice discloses an expansible bracket for valve fixtures. This disclosure requires the use of screws to maintain the position of the bracket. The bracket is not disclosed as being appropriate for frictional engagement to maintain its position. This is clear since the bracket does not include means for applying opposing forces to its opposite ends, but merely includes a width adjustment means. Therefore, while it serves its intended purpose admirably, it would not be very satisfactory for use in meter boxes because of the difficulty in attachment to the side walls.

SUMMARY OF THE INVENTION

In one sense, the invention relates to an expansible device for setting meters in meter boxes. An embodiment of the expansible device can include a pointed first end and second end having two points which tend to rotate about a virtual axis which does not intersect the device. The expansible device must include means for forcing the first end apart from the second end and against opposite walls contacting the two ends. In another sense, the invention relates to a meter box having side walls and a top having a lid and a meter within the box connected to non-rigid plastic service pipes with connecting means and having the plastic service pipes positioned by passing through two holes in a straight piece of pipe of larger diameter than the service pipes. The two holes which said plastic service pipes pass through are oriented in a parallel relationship. This second view of the invention also includes means for positioning the straight piece of pipe within the meter box.

While the above summary may be of some assistance in understanding the invention, it should be understood that the precise scope of the present invention is defined and set forth only in the claims. Use of the invention defined in the claims can eliminate problems which heretofore existed through the use of plastic service pipes and in particular can eliminate these problems at a very low cost. The present invention can be installed very rapidly and simply and can provide a very stable mounting for meters.

DESCRIPTION OF THE PREFERRED EMBODIMENTS

Figure 1:
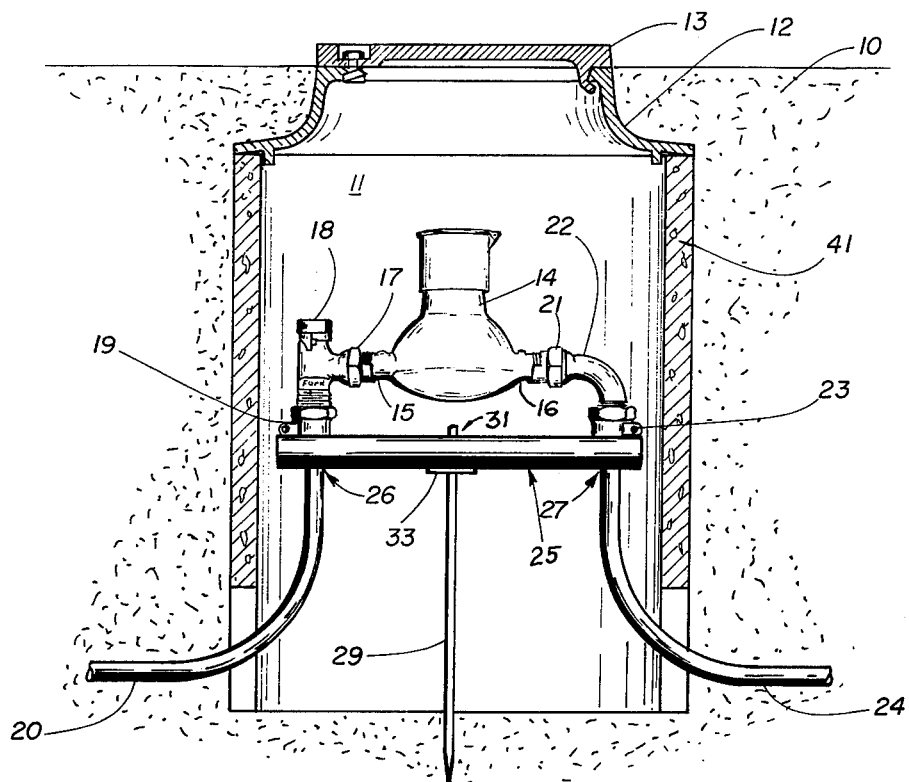
FIG. 1 is a sectional elevation showing one form of the invention which incorporates within a conventional meter box a vertical shaft supporting a horizontally oriented straight piece of pipe which is used to support non-rigid plastic service pipes.

Referring in particular to FIG. 1, there is illustrated buried in the ground 10 a cylindrical meter box 11 having a top portion 12 which includes a lid 13. The lid 13 is easily opened to allow inspection of a meter 14 within the meter box 11.

The meter 14 in FIG. 1 is connected at its inlet 15 with the use of a saddle nut 17 to an inverted key inlet valve 18 which connects to a pack joint nut 19 for connection of a non-rigid plastic service pipe 20 to the inverted key inlet valve 18. The outlet 16 of the meter 14 connects with a saddle nut 21 to a quarter bend connecting member 22 and then to a pack joint nut 23 which serves to connect a second non-rigid plastic service pipe 24 to the angular connecting member 22. Through this configuration, water can pass from a service main through pipe 20 and valve 18 to the meter 14 and then through the angular connecting member 22 and the non-rigid plastic service pipe 24 and to the place of use.

To position this configuration in place, FIG. 1 discloses a horizontally positioned straight piece of rigid pipe 25 made of polyvinyl chloride (often referred to as PVC). Two holes 26 and 27 are present near each end of the straight pipe 25. These holes are in a parallel relationship to one another and they intersect the center axis of the straight pipe 25. The non-rigid plastic service pipes 20 and 24 pass through the holes 26 and 27, respectively. Holes 26 and 27 are just slightly larger than the service pipes 20 and 24 so that the orientation of the service pipes and meter with respect to the straight pipe 25 is maintained.

To maintain the straight pipe 25 in position within the meter box 11, a shaft 29 with a pointed end 30 extending into the soil at the base of the meter box passes through a third hole 31 located midway between holes 26 and 27. Third hole 31 passes transaxially through the straight pipe 25 in a parallel relationship to holes 26 and 27. A stop 33 is positioned near the upper portion of shaft 29 to prevent straight pipe 25 from sliding down shaft 29 beyond the desired amount.

Figure 2:
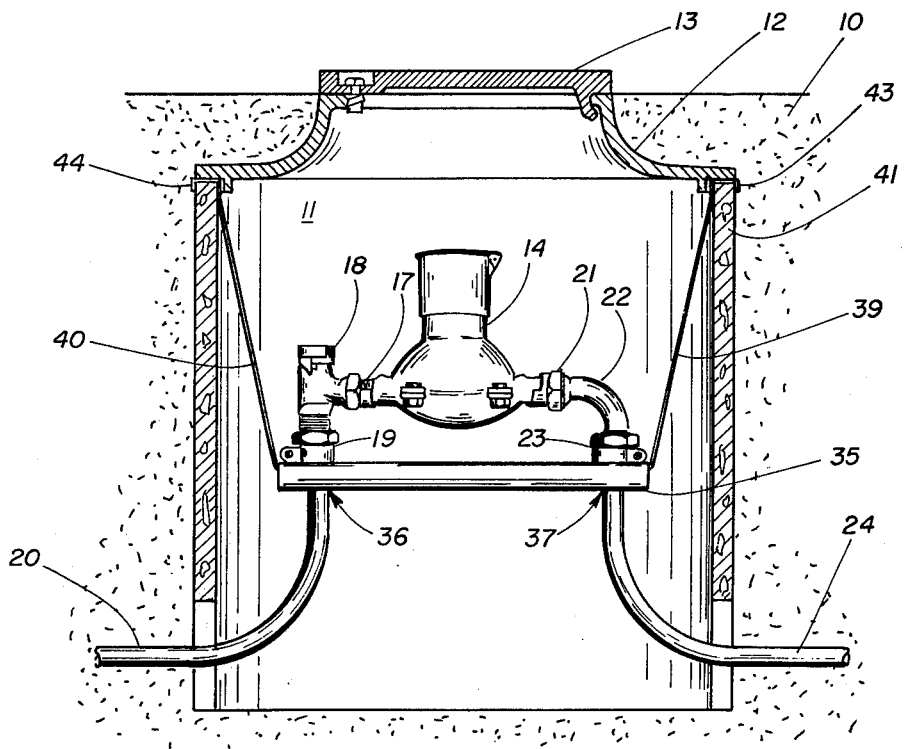
FIG. 2 is a sectional elevation showing a second form of the invention and showing wires supporting a straight piece of pipe which is used to position the service pipes.

Referring now to FIG. 2, there is illustrated an arrangement which is similar in many respects to the arrangement of FIG. 1. The meter 14, service pipes 20 and 24 and associated connecting means for connecting the service pipes to the meter (including saddle nuts 17, inverted key inlet valve 18, pack joint nut 19, saddle nut 21, quarter bend angular connecting member 22 and pack joint nut 23) are the same. These items are supported in position by a straight piece of polyvinyl chloride rigid pipe 35 which has holes 36 and 37 similar to holes 26 and 27 of FIG. 1. Holes 36 and 37 are parallel and transaxially arranged holes sized slightly larger than service pipes 20 and 24 and through which the service pipes pass. Straight pipe 35 is maintained in position within the meter box by wires 39 and 40 attached near each end of the straight pipe 35 and extending to opposite portions of the junction between the side walls 41 and the top 12 of the meter box. Wires 39 and 40 attach to brackets 43 and 44, respectively, at the junction. Brackets 43 and 44 serve to firmly attach the wires to the junction without damage to the wires.

Figure 3:
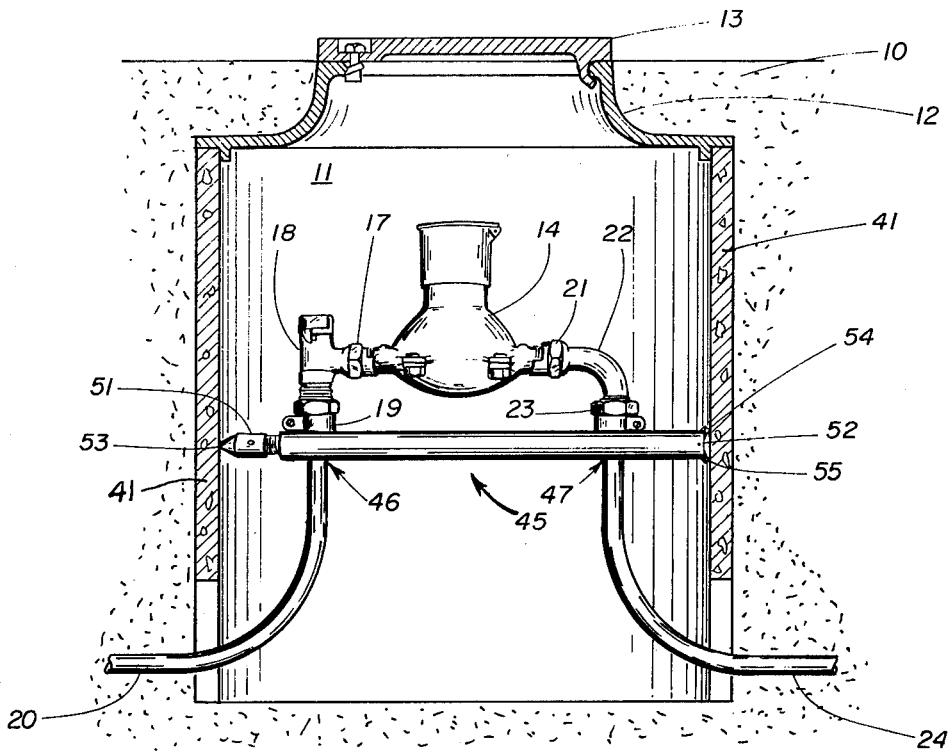
FIG. 3 is a sectional elevation showing a third form of the invention which includes a straight piece of pipe used to maintain the service pipes in position and itself being maintained in position by having associated with it a cylindrical portion threaded in one end thereof in a manner to allow expansion of the combination to press against opposite sides of the meter box.

Referring now to FIG. 3, there is illustrated a meter box 11 of the type described in FIGS. 1 and 2 with a meter, service pipes, and connecting means of the type described in FIGS. 1 and 2. To maintain the position of the meter and connecting means within the meter box shown in FIG. 3, there is illustrated an expansible member 45 which has two holes 46 and 47 arranged in a parallel relationship to each other and passing transaxially through expansible member 45. The holes are sized slightly larger than the service pipes 20 and 24 and the service pipes are positioned to pass through holes 46 and 47, respectively. Expansible member 45 has a first end 51 which has one point 53 which contacts the side wall 41 of the meter box 11. Expansible member 45 has a second end 52 which has two points 54 and 55 which contact a diametrically opposite portion of the side walls 41 of the cylindrically shaped meter box 11.

Figure 4:
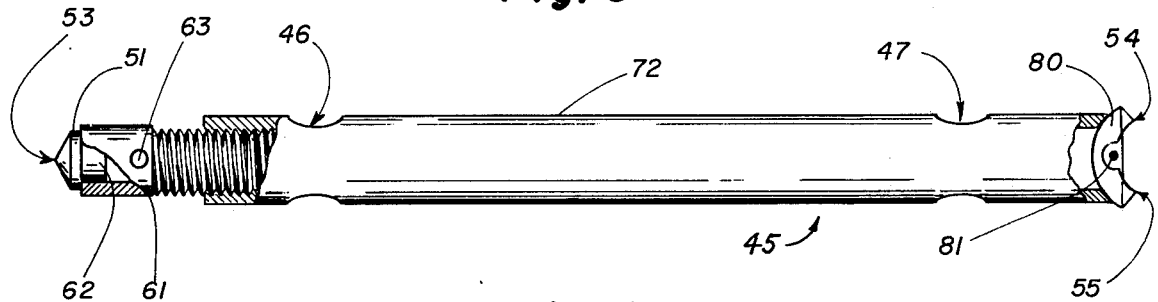
FIG. 4 illustrates the expansible member of FIG. 3 in more detail and FIG. 5 shows a top view of the expansible member of FIG. 4.
Figure 5:
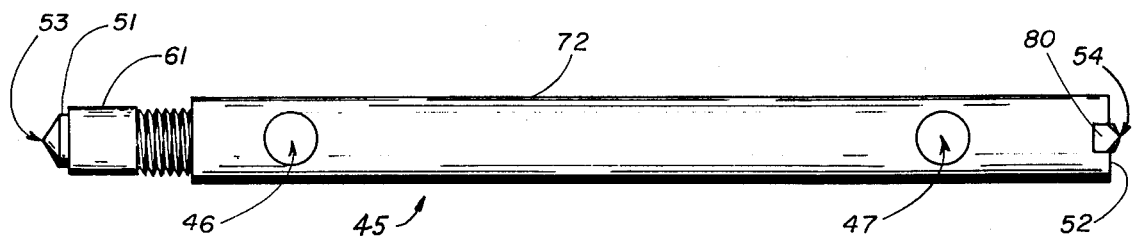

Referring more particularly to FIGS. 4 and 5, there is illustrated in more detail the expansible member 45 of FIG. 3. It can be seen from the drawings that expansible member 45 has means for forcing its first end 51 and its second end 52 apart from each other and against opposite portions of side walls of a meter box. The expansible member 45 has a first cylindrical portion 61 made of polyvinyl chloride. The first cylindrical portion 61 is externally threaded at one end and includes a plug 62 at its other end. Plug 62 provides a point 53 along the axis of the first cylindrical portion 61 at its first end. A transaxial hole 63 is provided in the first cylindrical portion 61 in order that a screw driver or other tightening means may be placed therein to assist in rotating the first cylindrical portion 61 with respect to the remainder of the expansible member.

The expansible member 45 also includes a second cylindrical portion which is made of a straight piece of rigid polyvinyl chloride pipe and which has an internally threaded end which engages with the threaded end of the first cylindrical portion 61. The second cylindrical portion 72 has within it the holes 46 and 47 for maintaining the service pipes 20 and 24 which pass there through in fixed relation to the expansible member. At the second end 52 of the second cylindrical portion 72, there is positioned within a slot an arcuately shaped piece 80 having a point 54 and 55 at each end. At the center of the arcuately shaped piece 80, there is a notch through which a pin 81 passes. Pin 81 extends diametrically across the second cylindrical portion 72 near its second end and serves as a retaining means for maintaining the arcuately shaped piece 80 in its corresponding slot.

It can be observed that the curve of the arcuately shaped piece will in this configuration cause rotational movement of points 54 and 55 and the piece 80 itself to be about a virtual axis of rotation which extends beyond the expansible member and does not intersect the expansible member 45. This effect of the arcuately shaped piece 80 in this configuration is to insure stability of the expansible member 80 regardless of slight misalignments of the expansible member in its expansion within a meter box by rotation of the first cylindrical portion with respect to the second cylindrical portion. The fact that two points engage the meter box wall at the second end of the expansible member prevents rotation of the expansible member and thereby prevents instability of the meter within the meter box.

It can be observed that the installation of the device shown in FIGS. 3 and 4 into a meter box can be very rapid and can be used with non-rigid plastic service pipes. While there have been described above the principles of this invention in connection with specific devices, it is to be clearly understood that this description is made only by way of example and not as a limitation to the scope of the invention.

What is claimed is:

1. The combination comprising:
   a. a meter box having side walls and a top having a lid;
   b. a meter within said meter box;
   c. service pipes;
   d. means connecting said service pipes to said meter;
   e. an expansible member having a first end and a second end contacting opposite portions of the side walls of said meter box, said expansible member including means for forcing said first end and second end apart from each other and against opposite portions of the side walls;

f. means for maintaining the service pipes in a fixed relation to said expansible member; and g. said second end of said expansible member including a contacting portion for contacting the side walls which contacting portion is rotatably mounted to permit rotation about an axis which is not parallel to the longitudinal axis of the expansible member.

2. The combination of claim 1 in which said service pipes are non-rigid, plastic material.

3. The combination of claim 1 in which the second end has exactly two points which contact the side wall and in which the first end has only one point which contacts the side wall.

4. The combination of claim 1 in which said meter box is cylindrically shaped and said first end and second end are positioned on diametrically opposed portions of said meter box.

5. The combination of claim 4 in which said expansible member includes a tubular portion of larger diameter than said service pipes and in which said means for maintaining includes two holes transaxially passing through said tubular portion of said expansible member through which said service pipes pass.

6. The combination of claim 1 in which the second end of said expansible member includes two movable points contacting the side wall and having means for causing at least a portion of the movement of said two points to be about a virtual axis of rotation which does not intersect the expansible member.

7. The combination of claim 6 in which said means for causing includes a generally arc shaped piece positioned in a slot near the second end of said expansible member.

8. The combination of claim 6 in which the second end has only two points which contact the side wall and in which the first end has only one point which contacts the side wall.

9. The combination of claim 8 in which said means for maintaining includes in said expansible member two holes through which said service pipes pass.

10. The combination of claim 9 in which said expansible member includes a first and second cylindrical portion coaxially aligned along a line between said first end and said second end.

11. The combination of claim 10 in which said first cylindrical portion contacts said second cylindrical portion between said first end and said two holes.

12. The combination of claim 11 in which said cylindrical portions are each threaded and one is threadedly engaged within the other.

13. The combination of claim 12 in which said service pipes are non-rigid, plastic material.

* * * * *